(12) United States Patent
Zhang et al.

(10) Patent No.: US 10,308,532 B2
(45) Date of Patent: Jun. 4, 2019

(54) METHOD TO TREAT FLUSHING LIQUOR SYSTEMS IN COKE PLANTS

(75) Inventors: Guixi Zhang, Shanghai (CN); Jason Zhao, Shanghai (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 337 days.

(21) Appl. No.: 14/394,272

(22) PCT Filed: Apr. 18, 2012

(86) PCT No.: PCT/CN2012/074253
§ 371 (c)(1),
(2), (4) Date: Oct. 14, 2014

(87) PCT Pub. No.: WO2013/155679
PCT Pub. Date: Oct. 24, 2013

(65) Prior Publication Data
US 2015/0053622 A1 Feb. 26, 2015

(51) Int. Cl.
| | |
|---|---|
| C02F 103/36 | (2006.01) |
| C02F 101/32 | (2006.01) |
| C08F 220/56 | (2006.01) |
| C02F 1/52 | (2006.01) |
| C10G 33/04 | (2006.01) |
| B01D 17/04 | (2006.01) |
| C08F 220/34 | (2006.01) |

(Continued)

(52) U.S. Cl.
CPC .......... C02F 1/5272 (2013.01); B01D 17/047 (2013.01); C02F 1/547 (2013.01); C08F 220/34 (2013.01); C10G 9/005 (2013.01); C10G 33/04 (2013.01); C02F 2101/32 (2013.01); C02F 2103/365 (2013.01); C02F 2305/00 (2013.01); C08F 220/56 (2013.01)

(58) Field of Classification Search
None
See application file for complete search history.

(56) References Cited

U.S. PATENT DOCUMENTS

| | | | |
|---|---|---|---|
| 3,478,003 A | 11/1969 | McClendon | |
| 4,120,815 A * | 10/1978 | Raman | C10G 33/04 |
| | | | 210/708 |

(Continued)

FOREIGN PATENT DOCUMENTS

| | | |
|---|---|---|
| CA | 2289306 A1 | 5/2000 |
| CN | 101648731 A | 2/2010 |

(Continued)

OTHER PUBLICATIONS

Process flow diagram—Typical oil refinery (pp. 1-2, accessed online Feb. 20, 2017).*

(Continued)

*Primary Examiner* — Clare M Perrin
(74) *Attorney, Agent, or Firm* — Wegman, Hessler & Vanderburg

(57) ABSTRACT

Methods are disclosed for reducing oil in water emulsions in coking processes. One exemplary method comprises: providing an aqueous stream with an oil in water emulsion; providing a treatment composition, wherein the treatment composition comprises at least one cationic polyacrylamide; and contacting the aqueous stream with the treatment composition.

17 Claims, 1 Drawing Sheet

(51) Int. Cl.
*C10G 9/00* (2006.01)
*C02F 1/54* (2006.01)

(56) References Cited

U.S. PATENT DOCUMENTS

| | | | |
|---|---|---|---|
| 4,154,698 A | 5/1979 | Doft | |
| 4,160,742 A * | 7/1979 | Raman | C02F 1/682 |
| | | | 210/708 |
| 4,180,643 A | 12/1979 | Moss et al. | |
| 4,396,752 A | 8/1983 | Cabestany et al. | |
| 4,741,835 A * | 5/1988 | Jacques | B01D 17/047 |
| | | | 210/708 |
| 4,800,039 A | 1/1989 | Hassick et al. | |
| 4,802,992 A * | 2/1989 | Fong | B01D 17/047 |
| | | | 210/709 |
| 4,857,621 A * | 8/1989 | Ball | C08F 220/56 |
| | | | 526/265 |
| 4,918,123 A * | 4/1990 | Yang | C02F 1/54 |
| | | | 524/110 |
| 5,110,448 A * | 5/1992 | Adams | B01D 17/047 |
| | | | 208/131 |
| 5,158,688 A | 10/1992 | Craven et al. | |
| 5,160,632 A | 11/1992 | Kleefisch et al. | |
| 5,368,744 A | 11/1994 | Wood et al. | |
| 5,449,463 A | 9/1995 | Elliott et al. | |
| 5,607,574 A | 3/1997 | Hart | |
| 5,720,887 A | 2/1998 | Vasconcellos et al. | |
| 5,730,882 A | 3/1998 | Gallup et al. | |
| 6,020,422 A | 2/2000 | Connors et al. | |
| 6,036,868 A * | 3/2000 | Sivakumar | B01D 17/047 |
| | | | 210/708 |
| 6,059,930 A | 5/2000 | Wong Shing et al. | |
| 6,294,093 B1 * | 9/2001 | Selvarajan | B01D 17/0202 |
| | | | 210/708 |
| 6,375,831 B1 | 4/2002 | Doyle et al. | |
| 6,605,674 B1 | 8/2003 | Whipple et al. | |
| 7,323,110 B1 | 1/2008 | Li | |
| 7,771,588 B2 | 8/2010 | Engel et al. | |
| 2004/0087717 A1 | 5/2004 | Peltier et al. | |
| 2005/0194323 A1 * | 9/2005 | Ruth | B01D 17/00 |
| | | | 210/723 |
| 2006/0003899 A1 | 1/2006 | Levey et al. | |
| 2011/0147306 A1 | 6/2011 | Polizzotti et al. | |

FOREIGN PATENT DOCUMENTS

| | | |
|---|---|---|
| CN | 101798152 A | 8/2010 |
| CN | 101955251 A | 1/2011 |
| CN | 102127465 A | 7/2011 |
| CN | 102249383 A | 11/2011 |
| CN | 102504851 A | 6/2012 |
| JP | 62161894 A | 7/1987 |
| JP | 0838809 A | 2/1996 |
| JP | 2000185202 A | 7/2000 |
| JP | 2001524993 A | 12/2001 |
| WO | 2009042284 | 4/2009 |

OTHER PUBLICATIONS

Unofficial English translation of Japanese Office Action issued in connection with corresponding JP Application No. 2015-506061 dated Jan. 26, 2016.

International Search Report and Written Opinion dated Jan. 24, 2013 which was issued in connection with PCT Patent Application No. PCT/CN2012/074253 which was filed on Apr. 18, 2012.

Unofficial English translation of Chinese Office Action issued in connection with corresponding CN Application No. 201280072496.2 dated May 29, 2015.

European Search Report and Opinion issued in connection with corresponding EP Application No. 12874525.4 dated Nov. 6, 2015.

* cited by examiner

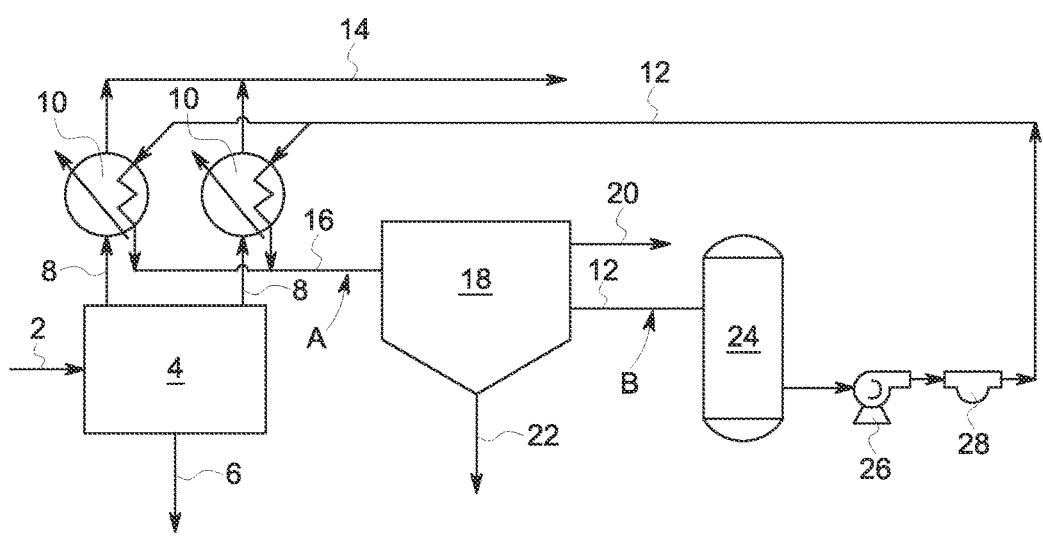

METHOD TO TREAT FLUSHING LIQUOR SYSTEMS IN COKE PLANTS

FIELD OF THE INVENTION

The invention pertains to methods for reducing oil in water emulsions in coking processes.

BACKGROUND OF THE INVENTION

In the coking processes, hot organic vapors are quenched by spraying the vapors with aqueous liquids, including water, called flushing liquor. In addition to quenching, the flushing liquor provides a carrying medium for the tars and other contaminants formed in the coking process. The contaminants include ammonia and hydrophobic compounds, such as coke powder and coal powder.

Coke and coal powders, however, frequently act as emulsifiers and form water in oil (W/O) emulsions in tar, or oil and water (O/W) emulsions in flushing liquor. If the tar/flushing liquor emulsion is not resolved, the emulsified particles will clog the spray nozzles when the flushing liquor is recycled through the coking process. Clogged nozzles may cause severe heating problems resulting in a failure of the coke process.

In the past decade, Coal Moisture Control (CMC) technology and applications have been researched and implemented in many countries to reduce energy consumption. The decrease in coal moisture, however, results in more coke and coal powders in the flushing liquor, thus increasing emulsification as compared to traditional coking processes. Thus, as the push towards energy reduction and CMC technology increases, there is an ever increasing need for demulsifying tar/flushing liquor emulsions.

BRIEF DESCRIPTION OF THE INVENTION

Accordingly, methods are disclosed for reducing oil in water emulsions present in aqueous streams of coking processes, including processes utilizing CMC technology.

One exemplary method comprises: providing an aqueous stream with an oil in water emulsion; providing a treatment composition, wherein the treatment composition comprises at least one cationic polyacrylamide; and contacting the aqueous stream with the treatment composition.

In another embodiment, the cationic polyacrylamide comprises repeat units (x) and (y) of the formula:

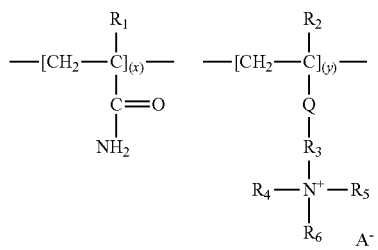

wherein $R_1$ and $R_2$ are the same or different and are chosen from H and $CH_3$; Q is —C(O)O—, or —OC(O)—, or —C(O)NH—; $R_3$ is branched or linear $C_1$-$C_4$ alkyl; $R_4$, $R_5$, and $R_6$ are independently chosen from H, $C_1$-$C_4$ linear or branched alkyl, or a $C_5$-$C_8$ aromatic or alkylaromatic group; A is an anion selected from $Cl^-$, $Br^-$, $HSO_4^-$, or $MeOSO_3^-$.

In another embodiment, repeat unit (y) comprises at least one member selected from the group consisting of dimethylaminoethyl (meth)acrylate methyl chloride quaternary salt, dimethylaminoethyl (meth)acrylate methyl sulfate quaternary salt, dimethylaminoethyl (meth)acrylate benzyl chloride quaternary salt, dimethylaminoethyl (meth)acrylate sulfuric acid salt, dimethylaminoethyl (meth)acrylate hydrochloric acid salt, acrylamidopropyl trimethylammonium chloride, dimethylaminopropyl (meth)acrylamide methyl sulfate quaternary salt, dimethylaminopropyl (meth)acrylamide hydrochloric acid salt, diethylaminoethylacrylate, diethylaminoethylmethacrylate, diallyldiethylammonium chloride, and diallyldimethyl ammonium chloride. In another embodiment, the repeat (y) unit comprises dimethylaminoethyl (meth)acrylate methyl chloride quaternary salt; and the repeat unit (x) comprises acrylamide.

In another embodiment, the molar ratio repeat units (x):(y) may range from about 95:5 to about 5:95. In yet another embodiment, the molar ratio of (x):(y) may range from about 10:90 to about 40:60. Alternatively, the molar ratio of (x):(y) may be about 20:80.

In another exemplary method, the treatment composition is introduced to the aqueous stream before the aqueous stream enters the decanter of the coking process. In another embodiment, the treatment composition is introduced at from about 0.01 ppm to about 1000 ppm by volume of the aqueous stream. In yet another embodiment, the treatment composition is introduced at from about 0.5 ppm to about 500 ppm by volume of the aqueous stream. Alternatively, the treatment composition is introduced at from about 1 ppm to about 10 ppm by volume of the aqueous stream.

In another method, the treatment composition may further comprise a surfactant. The surfactant may comprise at least one ethoxylated compound having the formula:

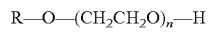

where n may be equal to or greater than about 20; and R may be at least one chain of a branched alkyl phenol, a branched or linear fatty alcohol, a fatty acid alkanolamide, or a fatty acid. In yet another method, the ethoxylated compound comprises at least one member selected from the group consisting of polyoxyethylene (20) sorbitan monolaurate, octylphenol ethoxylate, glycols, polyethylene, mono[(1,1,3,3-tetramethylbutyl)phenyl] ether, 2-ethylhexanol propylene ethylene glycol ether, poly(ethylene glycol-co-propylene glycol) monobutyl ether, ethoxylated fatty alcohol, alcohol ethoxylate, secondary alcohol ethoxylate, polyoxyethylene 2,6,8-trimethyl-4-nonyl ether, fatty alcohol alkoxylate, oxo alcohol ethoxylate, oxirane, and methyl-oxirane.

The concentration ratio in ppm of the surfactant to the cationic polyacrylamide in the treatment composition may range from about 4:1 to about 1:4. In another embodiment, the concentration ratio in ppm of the surfactant to the cationic polyacrylamide in the treatment composition may be about 2:1.5. Alternatively, the concentration ratio in ppm of the surfactant to the cationic polyacrylamide in the treatment composition may be about 2:1.

BRIEF DESCRIPTION OF THE DRAWINGS

FIG. 1 shows a simplified flushing liquor system of a coking process.

DETAILED DESCRIPTION OF EXEMPLARY EMBODIMENTS

FIG. 1 shows a simplified coke flushing liquor system. Coal (2) is fed into a coke battery (4). As the coal is carbonized into coke (6) in the coke battery (4), many organics in the coke volatize, forming an organic vapor (8). The organic vapor (8) leaves the coke battery through one or more standpipes followed by one or more goosenecks that serve as condensers (10). Inside the condensers (10), the organic vapor is "quenched" by spraying liquid water, called "flushing liquor" (12) into the condenser. The quenching process brings the 700-1000° C. organic vapor down to about 80° C. The condensed organics form high-molecular weight compounds known as tar. The remaining gas (14) is transferred elsewhere for further processing.

In addition to quenching, the flushing liquor provides a carrying medium for the tars and other contaminants formed in the coking process. The contaminants include ammonia, and hydrophobic compounds, such as coke powder and coal powder. The tar and flushing liquor stream (16) then passes to a decanter (18), where the tar (20) and any solids (22) are separated from the flushing liquor (12).

The recovered flushing liquor (12) then passes to a storage tank (24) from which it can be pumped (26) through a strainer (28) and again used to quench organic vapors in the condensers (10). Coke and coal powders, however, frequently act as emulsifiers and form water in oil (W/O) emulsions in tar, or oil and water (O/W) emulsions in flushing liquor. If the tar/flushing liquor emulsion is not demulsified in the decanter (18), the emulsified particles will clog the spray nozzles in the condensers (10). Clogged nozzles may cause severe heating problems resulting in a failure of the coke process.

In the past decade, Coal Moisture Control (CMC) technology and applications have been researched and implemented in many countries to reduce energy consumption. The decrease in coal moisture, however, results in more coke and coal powders in the flushing liquor, thus increasing emulsification as compared to traditional coking processes. Thus, as the push towards energy reduction and CMC technology increases, there is an ever increasing need for demulsifying tar/flushing liquor emulsions.

Accordingly, methods are disclosed for reducing oil in water emulsions present in aqueous streams of coking processes, including processes utilizing CMC technology.

One exemplary method comprises: providing an aqueous stream with an oil in water emulsion; providing a treatment composition, wherein the treatment composition comprises at least one cationic polyacrylamide; and contacting the aqueous stream with the treatment composition.

Cationic polyacrylamides are water-soluble copolymers formed by polymerizing acrylic monomers with cationic monomers. Suitable acrylic monomers include, but are not limited to, acrylamide, or a substituted acrylamide such as methacrylamide. Suitable cationic monomers include, but are not limited to, acrylates and their quaternary or acid salts. Methods for preparing these polymers are described in U.S. Pat. Nos. 5,368,744 and 6,605,674; the contents of which are incorporated by reference.

In another embodiment, the cationic polyacrylamide comprises repeat units (x) and (y) of the formula:

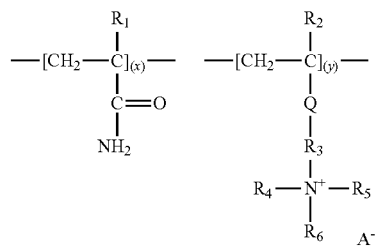

wherein $R_1$ and $R_2$ are the same or different and are chosen from H and $CH_3$; Q is —C(O)O—, or —OC(O)—, or —C(O)NH—; $R_3$ is branched or linear $C_1$-$C_4$ alkyl; $R_4$, $R_5$, and $R_6$ are independently chosen from H, $C_1$-$C_4$ linear or branched alkyl, or a $C_5$-$C_8$ aromatic or alkylaromatic group; A is an anion selected from $Cl^-$, $Br^-$, $HSO_4^-$, or $MeOSO_3^-$.

In another embodiment, repeat unit (y) comprises at least one member selected from the group consisting of dimethylaminoethyl (meth)acrylate methyl chloride quaternary salt, dimethylaminoethyl (meth)acrylate methyl sulfate quaternary salt, dimethylaminoethyl (meth)acrylate benzyl chloride quaternary salt, dimethylaminoethyl (meth)acrylate sulfuric acid salt, dimethylaminoethyl (meth)acrylate hydrochloric acid salt, acrylamidopropyl trimethylammonium chloride, dimethylaminopropyl (meth)acrylamide methyl sulfate quaternary salt, dimethylaminopropyl (meth)acrylamide hydrochloric acid salt, diethylaminoethylacrylate, diethylaminoethylmethacrylate, diallyldiethylammonium chloride, and diallyldimethyl ammonium chloride. In another embodiment, the repeat (y) unit comprises dimethylaminoethyl (meth)acrylate methyl chloride quaternary salt; and the repeat unit (x) comprises acrylamide.

In another embodiment, the molar ratio repeat units (x):(y) may range from about 95:5 to about 5:95. In yet another embodiment, the molar ratio of (x):(y) may range from about 10:90 to about 40:60. Alternatively, the molar ratio of (x):(y) may be about 20:80.

In another exemplary method, the treatment composition is introduced to the aqueous stream before the aqueous stream enters the decanter (A, FIG. 1) of the coking process. Optionally, the treatment compositions may be used in tar storage, the tar refinery, or the tar extractor to further remove the water in tar (not shown).

The amount of treatment composition required may vary depending on process conditions. For example, larger treatment composition amounts may be required when treatment is initiated. Once O/W emulsions have been reduced to acceptable levels, smaller treatment composition amounts may be sufficient. In another embodiment, the treatment composition is introduced at from about 0.01 ppm to about 1000 ppm by volume of the aqueous stream. In yet another embodiment, the treatment composition is introduced at from about 0.5 ppm to about 500 ppm by volume of the aqueous stream. Alternatively, the treatment composition is introduced at from about 1 ppm to about 10 ppm by volume of the aqueous stream.

In another method, the treatment composition may further comprise a surfactant. The surfactant may comprise at least one ethoxylated compound having the formula:

where n may be equal to or greater than about 20; and R may be at least one chain of a branched alkyl phenol, a branched or linear fatty alcohol, a fatty acid alkanolamide, or a fatty acid. In yet another method, the ethoxylated compound comprises at least one member selected from the group consisting of polyoxyethylene (20) sorbitan monolaurate, octylphenol ethoxylate, glycols, polyethylene, mono[(1,1,3,3-tetramethylbutyl)phenyl] ether, 2-ethylhexanol propylene ethylene glycol ether, poly(ethylene glycol-co-propylene glycol) monobutyl ether, ethoxylated fatty alcohol, alcohol ethoxylate, secondary alcohol ethoxylate, polyoxyethylene 2,6,8-trimethyl-4-nonyl ether, fatty alcohol alkoxylate, oxo alcohol ethoxylate, oxirane, and methyl-oxirane.

Optionally, surfactant may be added after the decanter (B, FIG. 1) in addition to, or instead of any surfactant present in the treatment composition.

The concentration ratio in ppm of the surfactant to the cationic polyacrylamide in the treatment composition may range from about 4:1 to about 1:4. In another embodiment, the concentration ratio in ppm of the surfactant to the cationic polyacrylamide in the treatment composition may be about 2:1.5. Alternatively, the concentration ratio in ppm of the surfactant to the cationic polyacrylamide in the treatment composition may be about 2:1.

In order that those skilled in the art will be better able to practice the present disclosure, the following examples are given by way of illustration and not by way of limitation.

EXAMPLES

Example 1

In Example 1, an emulsion of tar and flushing liquor was prepared to simulate contaminated flushing liquor from a coal coke process. Coal powder (6 grams), coke powder (9 grams), and flushing liquor (water, 335 grams) were obtained from Chinese coke plant #1 and charged into a 1000 ml resin kettle equipped with a condenser, a stirrer, a temperature controller, and a heating mantle. The solution was stirred at 85° C. and 1000 rpm for 20 minutes. Then, coal tar (150 grams) was added to the reactor and stirred at 85° C. and 1000 rpm for 30 minutes. The result was a simulated contaminated flushing liquor with a tar/flushing liquor emulsion of the composition listed in Table 1.

TABLE 1

Composition of tar/flushing liquor emulsion

| Components | Formulation (g) | Supplier |
| --- | --- | --- |
| Coal Powder (<100 mesh) | 6 | Coke Plant #1 |
| Coke Powder (<100 mesh) | 9 | Coke Plant #1 |
| Flushing Liquor (water) | 335 | Coke Plant #1 |
| Coal Tar | 150 | Coke Plant #1 |

Comparative Example 1

Turbidity of aqueous systems increases with formation of O/W emulsions. Conversely, a decrease in turbidity of aqueous systems is an indication of demulsification. Thus, various O/W emulsions were measured with a nephelometer to determine the turbidity in nephelometric turbidity units (NTU) and assess the effectiveness of various demulsifying treatments.

Comparative Example 1 shows the effectiveness of a typical demulsifying treatment, comparative compound 1 ("C1"). C1 is an ethylene oxide—propylene oxide copolymer (EO/PO) surfactant. Turbidity results at various treatment levels of C1 are shown in Table 2. The results show C1 is effective to demulsify tar/flushing liquor emulsions.

TABLE 2

Results of C1

| Treatment | Turbidity |
| --- | --- |
| Blank | 442 |
| 150 ppm C1 | 249 |
| 300 ppm C1 | 261 |
| 450 ppm C1 | 305 |

Example 2

Example 2 shows the effectiveness of various demulsifying treatments on the simulated contaminated flushing liquor with a tar/flushing emulsion described in Example 1. Comparative compound 2 ("C2") is sorbitan mono-oleate; a typical commercialized surfactant, Span-80 from Croda, which can help to remove oil slicks on flushing liquor surfaces. Exemplary compound 1 ("EX1") is a water-soluble cationic acrylamide comprising 80 mol % dimethylaminoethyl methacrylate chloridequarternary salt (AETAC). Various demulsifying treatments were added to different samples of tar/flushing emulsions. After adding the treatments to the emulsions, the mixtures were stirred at 600 rpm for 5 minutes. After 5 minutes, stirring was stopped and the mixtures were allowed to rest for 30 minutes. The top liquid layer was then tested for turbidity. The results are shown in Table 3.

TABLE 3

Results of various emulsifying treatments

| Treatment | Oil slick | Turbidity |
| --- | --- | --- |
| Blank | Heavy | 515 |
| 20 ppm C2 | Slight | 510 |
| 20 ppm C2/5 ppm EX1 | Slight | 154 |
| 20 ppm C2/10 ppm EX1 | Slight | 50 |
| 20 ppm C2/15 ppm EX1 | Slight | 27 |
| 300 ppm C1 | Moderate | 261 |

The data shows that a cationic polyacrylamide (EX1) can significantly demulsify tar/flushing liquor emulsions compared with the typical demulsifying treatment (C1) alone. The data also shows that the surfactant, C2, does not work alone as a demulsifying treatment. The treatment composition comprising both a cationic polyacrylamide (EX1) and a surfactant (C2) works to reduce both the oil slick and turbidity of tar/flushing liquor emulsions.

Example 3

Example 3 compares the effectiveness a cationic polyacrylamide (EX1) to a surfactant on tar/flushing liquor emulsions from Chinese coke plant #2. For this example, 100 ml of a tar/flushing liquor emulsions were charged to two 120 ml-bottles with caps. The bottles were heated to 85° C. in an oil bath for 20 minutes. Then, 10 ppm of a cationic polyacrylamide was added to one of the bottles. 10 ppm of an EO/PO copolymer (C1) typically used as a demulsifying treatment was added to the other bottle. The bottles were mixed by inverting them 15 times. The bottles were placed back in the 85° C. oil bath and allowed to rest for 35 minutes. After 35 minutes, the top aqueous layer was tested for turbidity. As can be seen in Table 4, the data shows the cationic polyacrylamide (EX1) is a more effective demulsifying treatment than an EO/PO (C1) copolymer typically used a demulsifying treatment, even at low concentrations.

TABLE 4

Results of various emulsifying treatments

| Treatment | Turbidity (NTU) |
|---|---|
| Blank | 339 |
| 10 ppm EX1 | 53 |
| 10 ppm C1 | 364 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, although exemplary embodiments disclose using the treatment compositions in the flushing system, the treatment compositions may be used in tar storage, the tar refinery, or the tar extractor to further remove the water in tar. Such other examples are intended to be within the scope of the claims if they have structural elements that do not differ from the literal language of the claims, or if they include equivalent structural elements with insubstantial differences from the literal languages of the claims.

What is claimed is:

1. A method of demulsifying an oil in water emulsion present in an aqueous stream of a coking process comprising:

passing said aqueous stream comprising an oil in water emulsion from an upstream to downstream direction to and through a decanter, wherein said oil in water emulsion comprises tars and other contaminants formed in a coking process; and contacting said aqueous stream with a treatment composition prior to introducing said aqueous stream into the decanter of said coking process, said treatment composition comprising a cationic polyacrylamide copolymer and downstream from said decanter, contacting said aqueous stream with an ethoxylated surfactant in addition to, or instead of any surfactant present in said treatment composition, wherein said ethoxylated surfactant comprises at least one ethoxylated compound having the formula:

R—O—(CH$_2$CH$_2$O)$_n$—H where n is equal to or greater than about 20; and R is at least one chain of a branched alkyl phenol, a branched or linear fatty alcohol, a fatty acid alkanolamide, or a fatty acid, and said cationic polyacrylamide copolymer comprising repeat units (x) and (y) of the formula

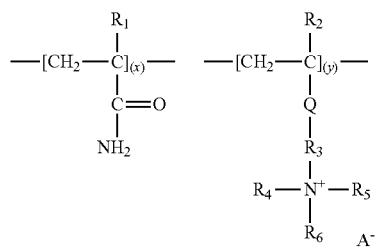

wherein $R_1$ and $R_2$ are the same or different and are chosen from H and CH$_3$; Q is —C(O)O—, or —OC(O)—, or —C(O)NH—; $R_3$ is branched or linear $C_1$-$C_4$ alkyl; $R_4$, $R_5$, and $R_6$ are independently chosen from H, $C_1$-$C_4$ linear or branched alkyl, or a $C_5$-$C_8$ aromatic or alkylaromatic group; A is an anion selected from Cl$^-$, Br$^-$, HSO$_4^-$, or MeOSO$_3^-$ wherein the molar ratio of repeat units (x):repeat units (y) is about 10:90 to about 40:60.

2. The method of claim 1, wherein said repeat unit (y) comprises at least one member selected from the group consisting of dimethylaminoethyl (meth)acrylate methyl chloride quaternary salt, dimethylaminoethyl (meth)acrylate methyl sulfate quaternary salt, dimethylaminoethyl (meth) acrylate benzyl chloride quaternary salt, acrylamidopropyl trimethylammonium chloride, dimethylaminopropyl (meth) acrylamide methyl sulfate quaternary salt, diallyldiethylammonium chloride, and diallyldimethyl ammonium chloride.

3. The method of claim 2, wherein:
   said repeat unit (y) comprises dimethylaminoethyl (meth) acrylate methyl chloride quaternary salt; and
   said repeat unit (x) comprises acrylamide.

4. The method of claim 3, wherein a molar ratio of repeat units (x):repeat units (y) is about 20:80.

5. The method of claim 1, wherein said treatment composition comprises about 0.01 ppm to about 1000 ppm by volume of said aqueous stream.

6. The method of claim 5, wherein said treatment composition comprises from about 0.5 ppm to about 500 ppm by volume of said aqueous stream.

7. The method of claim 6, wherein said treatment composition comprises from about 1 ppm to about 10 ppm by volume of said aqueous stream.

8. The method of claim 7, wherein a concentration ratio in ppm of said ethoxylated surfactant to said cationic polyacrylamide copolymer in said treatment composition ranges from about 4:1 to about 1:4.

9. The method of claim 1, wherein a concentration ratio in ppm of said ethoxylated surfactant to said cationic polyacrylamide copolymer in said treatment composition is about 2:1.5.

10. The method of claim 1, wherein a concentration ratio in ppm of said ethoxylated surfactant to said cationic polyacrylamide copolymer in said treatment composition is about 2:1.

11. The method as recited in claim 1, wherein said contaminants comprise ammonia, hydrophobic compounds, coal powder, coke powder, solids, or a combination thereof.

12. A method of demulsifying an oil in water emulsion present in an aqueous stream of a coking process comprising:

passing said aqueous stream comprising an oil in water emulsion from an upstream to downstream direction to and through a decanter, wherein said oil in water emulsion comprises tars and other contaminants formed in a coking process; and contacting said aqueous stream with a treatment composition prior to introducing said aqueous stream into the decanter of said coking process, said treatment composition comprising a cationic acrylamide copolymer and downstream from said decanter, contacting said aqueous stream with an ethoxylated surfactant in addition to, or instead of any surfactant present in said treatment composition, wherein said ethoxylated surfactant comprises at least one ethoxylated compound having the formula:

R—O—(CH$_2$CH$_2$O)$_n$—H where n is equal to or greater than about 20; and R is at least one chain of a branched alkyl phenol, a branched or linear fatty alcohol, a fatty acid alkanolamide, or a fatty acid, and said cationic acrylamide copolymer comprising repeat units of (x) (meth)acrylamide and (y) quaternary ammonium salt; wherein said repeat unit (y) of said cationic acrylamide copolymer comprises a member selected from the group consisting of:
a) dimethylaminoethyl (meth)acrylate methyl chloride;
b) dimethylaminoethyl (meth)acrylate methyl sulfate;
c) dimethylaminoethyl (meth)acrylate benzyl chloride;
d) acrylamidopropyl trimethylammonium chloride;
e) dimethylaminopropyl (meth)acrylamide methyl sulfate;
f) diallyldiethyl ammonium chloride; and
g) diallyldimethylammonium chloride.

13. The method as recited in claim 12, wherein said repeat unit (y) is dimethylaminoethyl (meth)acrylate quaternary ammonium salt and wherein the molar ratio of repeat units (x):repeat units (y) is from about 10:90 to about 40:60.

14. The method as recited in claim 13, wherein said repeat unit (y) is dimethylaminoethyl (meth)acrylate methyl chloride.

15. The method as recited in claim 14, wherein said molar ratio of repeat units (x):repeat units (y) is about 20:80.

16. The method as recited in claim 15, further comprising contacting said aqueous stream with a sorbitan mono-oleate surfactant.

17. The method as recited in claim 12, wherein said contaminants comprise ammonia, hydrophobic compounds, coal powder, coke powder, solids, or a combination thereof.

* * * * *